United States Patent
Ferguson et al.

(10) Patent No.: US 8,994,737 B2
(45) Date of Patent: Mar. 31, 2015

(54) SYSTEM FOR PARTICLE EDITING

(76) Inventors: Stuart Ferguson, Sunnyvale, CA (US);
Gregory Duquesne, Bordeaux (FR)

(*) Notice: Subject to any disclaimer, the term of this patent is extended or adjusted under 35 U.S.C. 154(b) by 198 days.

(21) Appl. No.: 13/435,194

(22) Filed: Mar. 30, 2012

(65) Prior Publication Data

US 2012/0249557 A1    Oct. 4, 2012

Related U.S. Application Data

(60) Provisional application No. 61/470,239, filed on Mar. 31, 2011.

(51) Int. Cl.
*G06T 13/00* (2011.01)
*G06T 17/20* (2006.01)
*G06T 19/20* (2011.01)

(52) U.S. Cl.
CPC ............... *G06T 13/00* (2013.01); *G06T 17/20* (2013.01); *G06T 19/20* (2013.01); *G06T 2210/56* (2013.01)

USPC ........................................ 345/473; 345/423

(58) Field of Classification Search
USPC ............................................ 345/473, 423
See application file for complete search history.

(56) References Cited

U.S. PATENT DOCUMENTS

2009/0040219 A1* 2/2009 Museth ................... 345/423
2010/0094597 A1* 4/2010 Blain et al. .................. 703/1

OTHER PUBLICATIONS

"Extracting and Parametrizing Temporally Coherent Surfaces From Particles" by Chen Shen Apurva Shah. Pixar Animation Studios 2007 p. 1.*

* cited by examiner

*Primary Examiner* — Maurice L McDowell, Jr.
(74) *Attorney, Agent, or Firm* — Gordon Rees Scully Mansukhani LLP

(57) ABSTRACT

A computer animation editing system having a sampler to sample a particle animation, a particle cache and polygon mesh editing tools configured to edit a particle simulation by converting a particle cache of the simulation into a polygon mesh, editing the polygon mesh and then converting the edited polygon mesh back into an edited particle cache.

11 Claims, 9 Drawing Sheets

SYSTEM FOR PARTICLE EDITING

RELATED APPLICATION

The present application claims priority under 35 U.S.C. Section 119 to U.S. Provisional patent application 61/470,239, entitled "Particle Cache Editing", filed Mar. 31, 2011 and incorporated herein by reference in its entirety.

TECHNICAL FIELD

The present invention relates to computer animation equipment.

BACKGROUND OF THE INVENTION

In computer animation, individual particles move and evolve on a computer screen in a process called a "particle simulation". Particle simulations are primarily used by animators to generate fuzzy or otherwise hard to render visual effects like water falling, smoke, fireworks, etc. Unfortunately, artists often lack direct control over all of the individual particles' movements. Although the visual effects of thousands or millions of particles moving on a screen can be visually pleasing, individual particles can be generated in the wrong place or time and may move or evolve in unpredictable or undesirable ways. Although the artist may wish to make changes to correct these problems, they typically have only limited tools at their disposal. This often forces the artist to tweak the conditions slightly, and then re-run the full simulation, hoping for a better result.

It would instead be desirable to provide a system that permits artists to manipulate particle animations using commonly existing 3D editing tools, such as mesh editing tools. This is because such commonly existing 3D mesh editing tools generally permit the artist to easily select, delete or copy individual elements, transform them in space, smooth or sculpt them, etc.

SUMMARY OF THE INVENTION

The present invention provides a physical system permitting the mesh editing of particle animations. In preferred embodiments, the present invention first converts a particle animation into a particle cache, and then converts a particle cache into a mesh. This advantageously provides a system in which a standard mesh editing tool can be used to then edit the properties of a particle animation. In addition, however, the present invention can also be used to convert a mesh back into a particle cache (while keeping the mesh edits intact). This allows an artist the freedom to edit the particle animation as a mesh and then return it to a particle cache such that it can be re-run as a new (edited) particle animation.

In one preferred embodiment, the present invention provides a method of editing a particle animation using a mesh editing tool, comprising: (a) inputting or running a particle animation for a plurality of particles, wherein each of the particles have position and particle attributes that change over time in the animation; (b) having a sampler sample the changing position and particle attributes for each of the plurality of particles at discrete times during the particle animation, wherein the sampler generates a unique particle ID for each particle, and associates the position and particle attributes for each particle with each particle ID at each of the discrete sample times; (c) caching the sampled position and particle attributes for each of the plurality of particles in a particle cache, wherein the cached position and particle attributes are organized by particle ID and are sorted in time order; (d) sending the cached position and particle attributes to a mesher; (e) having the mesher generate a polygon mesh comprising vertex points corresponding to the position of each of the sampled particles at each of the discrete sample times; (f) having the mesher tag each of the vertex points with the particle attributes and sample time corresponding to each of the sampled particles at each of the discrete sample times; (g) having the mesher link vertex points together as polylines, wherein each of the polylines corresponds to the positions of a particular particle at each of the discrete sample times; and (h) editing the polygon mesh with a mesh editing tool.

In another preferred embodiment, the present invention provides a computer animation editing system, comprising: (a) a sampler configured to: (i) sample changing position and particle attributes for a plurality of particles at discrete times during a particle animation, (ii) generate a unique particle ID for each particle, and (iii) associate the position and particle attributes for each particle with each particle ID at each of the discrete sample times; (b) a particle cache configured to store the position and particle attributes sampled by the sampler, wherein the cached position and particle attributes are organized in the particle cache by particle ID and are sorted in time order; and (c) a mesher configured to: (i) receive the position and particle attributes stored in the particle cache, (ii) generate a polygon mesh comprising vertex points corresponding to the position of each of the sampled particles at each of the discrete sample times, (iii) tag each of the vertex points with the particle attributes and sample time corresponding to each of the sampled particles at each of the discrete sample times, and (iv) link vertex points together as polylines, wherein each of the polylines corresponds to the positions of a particular particle at each of the discrete sample times.

DETAILED DESCRIPTION OF THE DRAWINGS

(a) Particles And Particle Animations

In computer animation approaches that use particle systems, a particle exists in 3D space, has defined properties, comes into existence, moves and finally is killed. However, in addition to having these (changing) positional X, Y and Z coordinates, it also may have many other features which may include velocity, mass, age, force, rotation, angular velocity, color, etc. In computer animation, a particle animation is a collection of many of these particles and the rules as to how they change over time. In computer animation, such particle animation approaches are typically used to create "fuzzy" visual phenomena such as waterfalls, smoke trails, etc. These particle animations are created by creating the individual particles that will have various initial states which are then altered over time. A particle's position may change based upon its velocity, with the velocity changing based upon the forces acting on the particle. The resulting particle animation is what occurs when the particles lives are run on screen over a period of time.

(b) Mesh Systems

In computer animation, a polygon (or polyline) mesh is defined as a collection of points (or vertices) in space, together with polygons that relate the points to one another. For example, three equidistant points can be connected to make an equilateral triangle. The points of the polygon are then defined to be tagged with features such as weight, color, etc. in addition to position.

(c) The Present Invention

Figure 1:
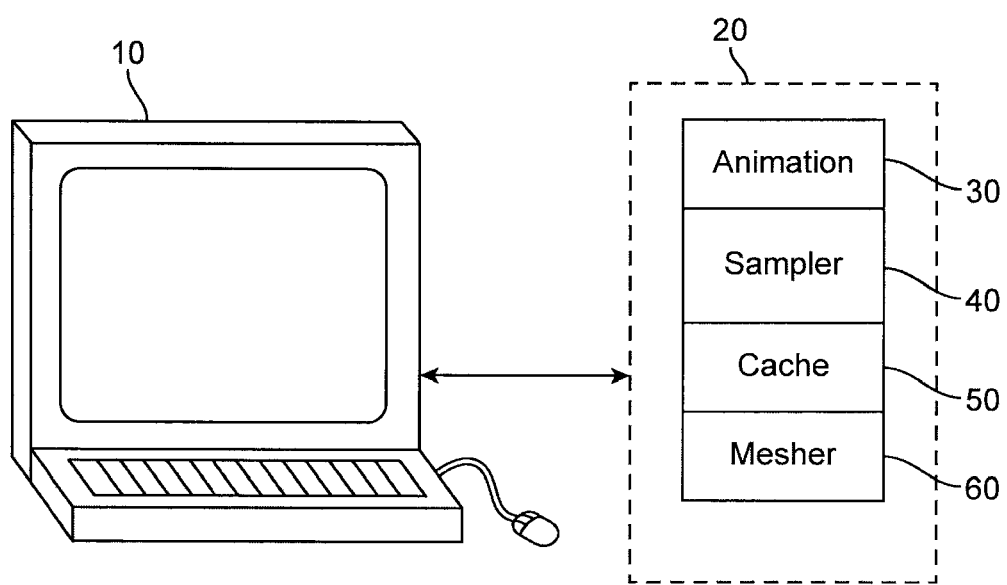
FIG. 1 is an overview of the components of the present system architecture.

FIG. 1 illustrates the components of the present system architecture, as follows. The present invention comprises a computer 10 and an animation system 20. Animation system 20 comprises a plurality of separate components, including particle animation 30, sampler 40, particle cache 50 and mesher 60. It is to be understood that animation system 20 may be resident on computer 10, or alternatively be accessed by computer 10 through a remote network. Each of components 30, 40, 50 and 60 may comprise separate physical equipment components, software modules, firmware components, or any combination thereof.

In accordance with the present invention, the following method steps may be performed by the present system components to edit a particle animation using a mesh editing tool.

First, animation 30 includes a particle simulation for a plurality of particles. Specifically, animation 30 generates changing particle properties for the plurality of particles, and then runs a particle simulation of these changing particle properties over a period of time. Such particle properties may include (but are not limited to) attributes such as color, velocity, mass, age, force or rotation. In accordance with the present invention, the artist may either run or design the animation himself/herself, or the animation may already have been designed and run and may simply be input into the present invention.

Second, sampler 40 then samples the changing position and particle attributes for each of the plurality of particles at discrete times during the particle animation. In addition, sampler 40 also generates a unique particle ID for each particle, and associates the position and particle attributes for each particle with each particle ID at each of the discrete sample times. In one preferred aspect, sampler 40 takes samples once per frame. However, other sampling periods are also possible, all keeping within the scope of the present invention.

Figure 2:
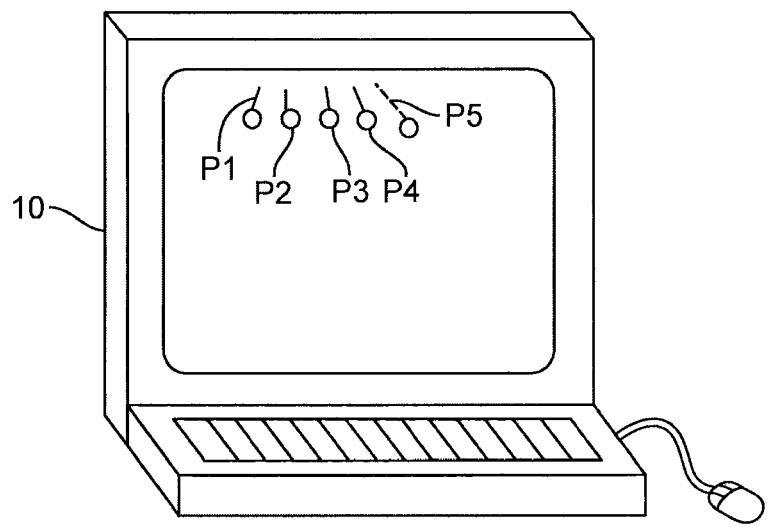
FIG. 2 is an illustration of the computer screen shortly after the start of a particle animation.
Figure 3:
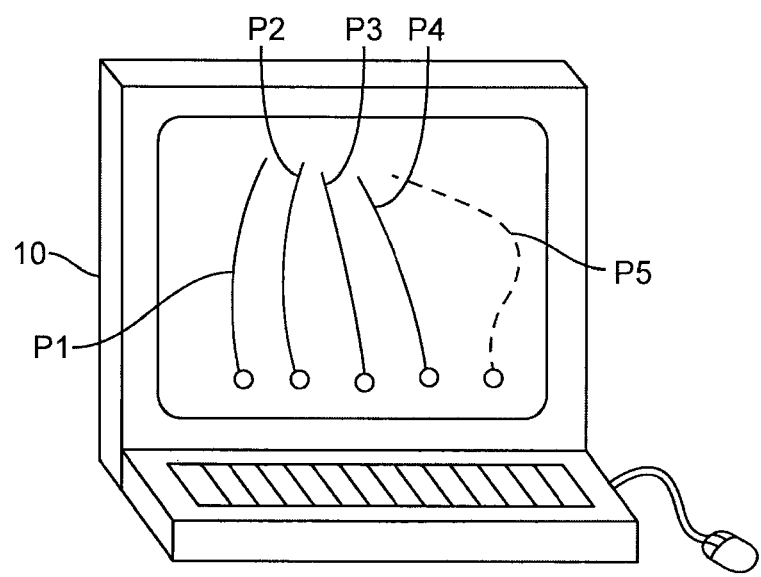
FIG. 3 is an illustration of the computer screen at the end of a particle animation showing a rogue particle.

FIGS. 2 and 3 show successive steps in a particle simulation. FIG. 2 is an illustration of the moment after the particle simulation starts, and FIG. 3 is an illustration of the moment when the particle simulation ends. In this illustrated example, the simulation is of particles falling downwards under the influence of gravity (such as a waterfall or firework embers falling). FIG. 2 illustrates five particles (P1, P2, P3, P4 and P5) clustered together the moment after the start of the simulation, and FIG. 3 illustrates a later period of time after the particles have fallen downwards. Note: only five particles P are illustrated in these figures, however, it is common practice to have thousands (or millions) of particles in a standard computer animation particle simulation. In addition, the individual particle paths are shown in FIGS. 2 and 3 in dotted lines to illustrate the fact that particle P5 is a "rogue" particle. Whereas particles P1 to P4 follow standard acceptable paths, particle P5 is following an unusual and undesirable trajectory. Normally, in any computer simulation involving a very large number of particles, a small number will typically go "rogue" and act in unpredictable ways (e.g.: moving in the wrong direction, or with the wrong speed or having an abrupt or choppy motion). As a result, the artist designing the computer graphics scene will want to isolate and delete such particles (or at least edit their trajectories). The present invention provides a system for doing just that.

Figure 4:
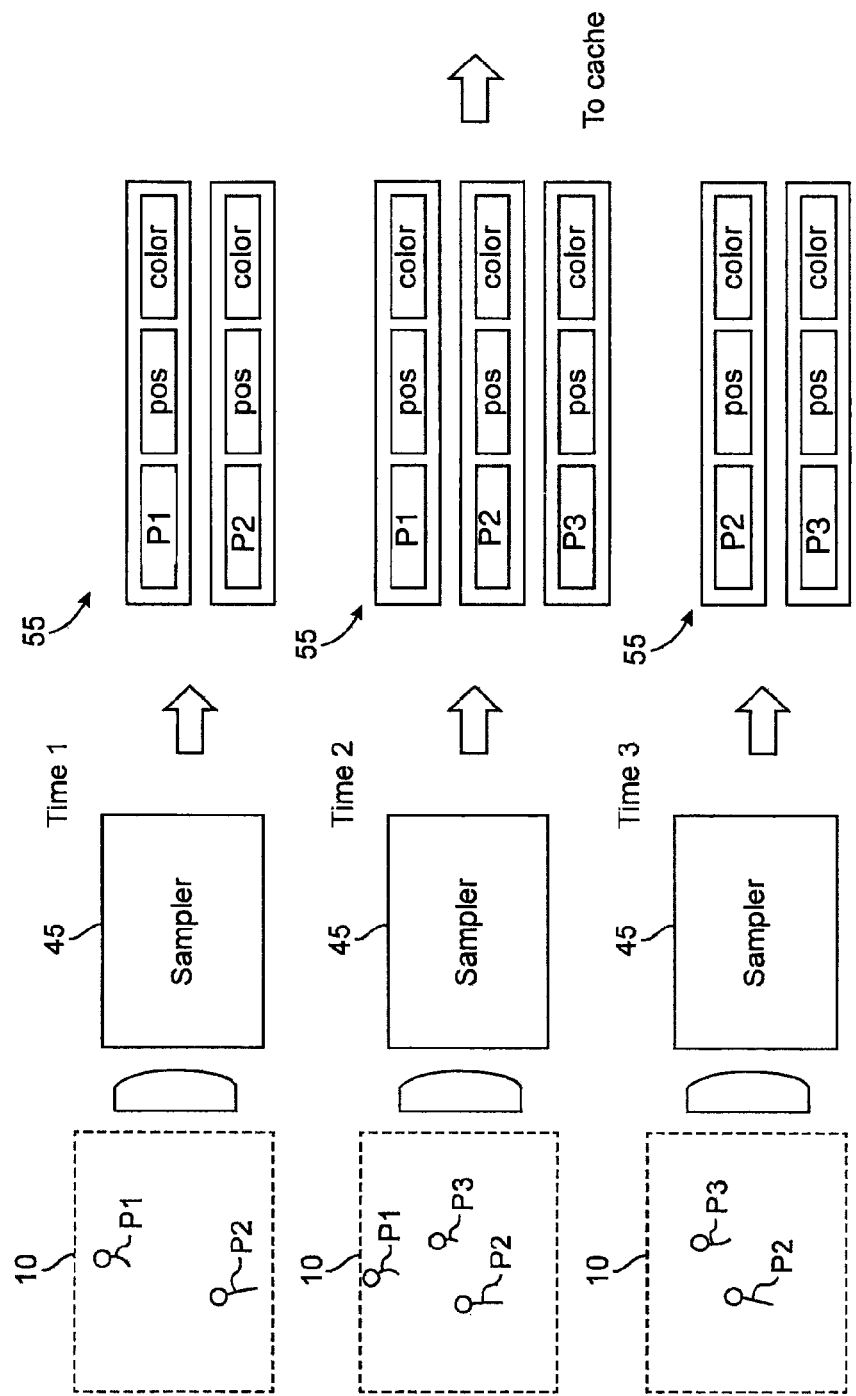
FIG. 4 is an illustration of a sampler sampling the particle animation to populate a particle cache.
Figure 5:
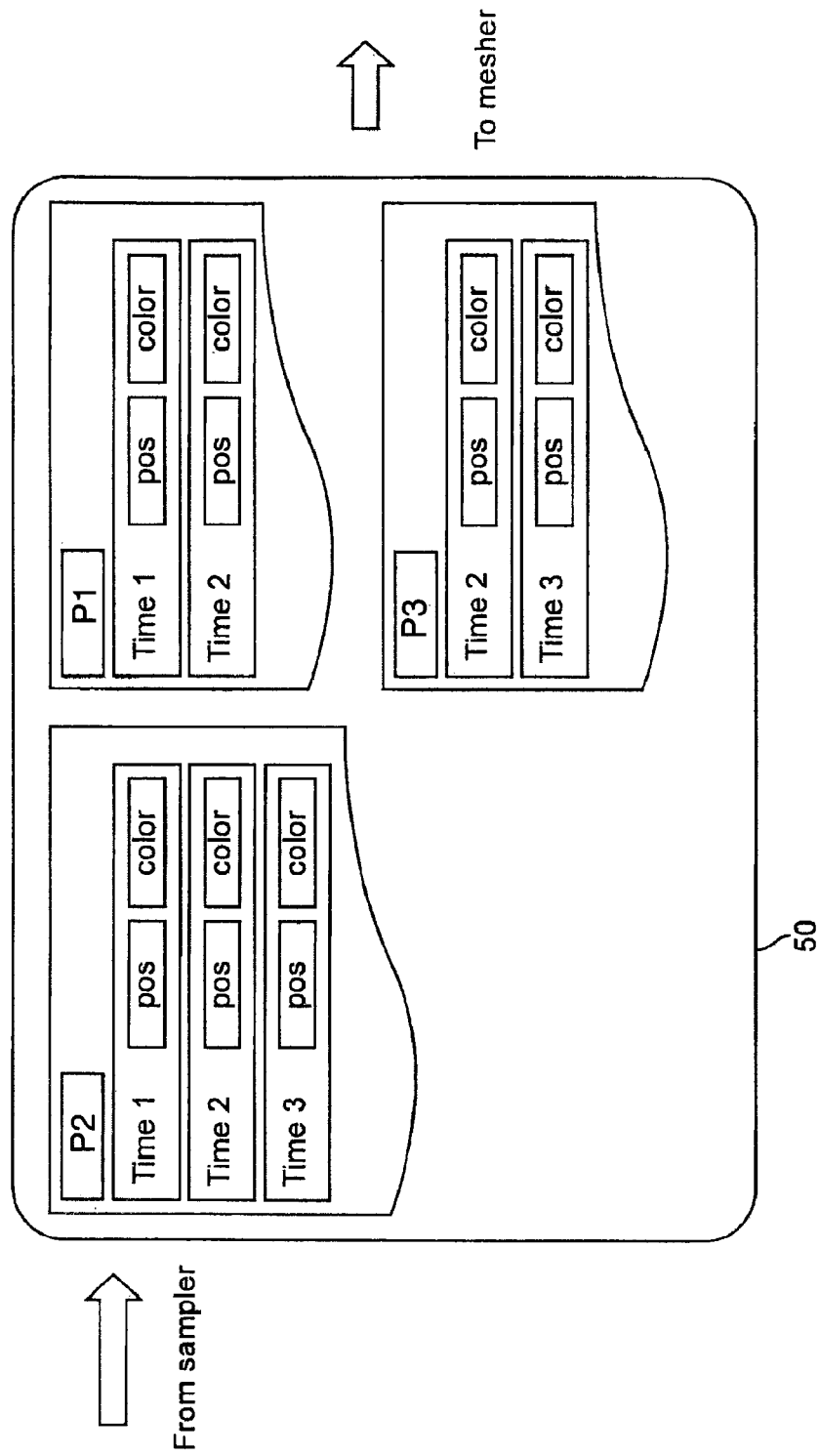
FIG. 5 is an illustration of the structure of particle record storage in the cache.

Third, the sampled position and particle attributes for each of the plurality of particle sample records 45 are then cached in cache 50 as individual cache records 55. In cache 50, the position and particle attributes are organized by particle ID and are also sorted in time order. Thus, the individual sample records 45 of the particle attributes stream from the sampler into the cache, with the cache taking them and organizing them. FIGS. 4 and 5 illustrate this process, as follows. In FIG. 4, particle motion on screen 10 is shown at three times, being Time 1, Time 2 and Time 3. At Time 1, sampler 40 samples the attributes of particles P1 and P2, storing their position "pos" and color "color" in particle cache 50 as shown. Next, at Time 2, sampler 40 samples the attributes of particles P1, P2 and (newly appeared) P3, storing their positions "pos" and color "color" in particle cache 50 as shown. Next, at Time 3, particle P1 has disappeared and sampler 40 now stores the attributes of particles P2 and P3 in particle cache 50 as shown. FIG. 5 shows further details of the particle cache. Specifically, the individual records of the particle attributes stream from the sampler into the cache with the cache then taking all of them and organizing them into bins by particle ID which are then sorted into time order, as shown. (Note: the particles illustrated in FIGS. 4 and 5 are different from those in FIGS. 2 and 3).

Figure 6:
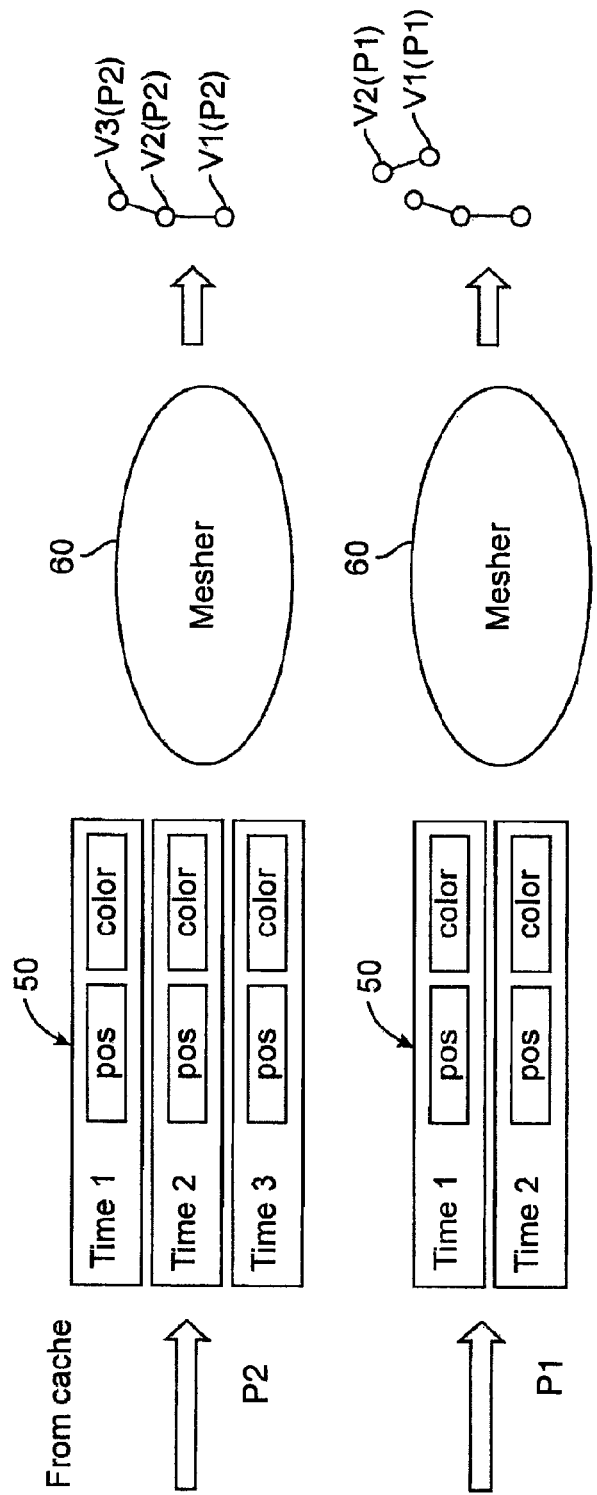
FIG. 6 is an illustration of a mesher creating a polygon mesh from particle records stored in the particle cache.

Fourth, as seen in FIG. 6, the cached particle position and attributes are then sent from cache 50 to mesher 60. Mesher 60 first generates a polygon mesh comprising vertex points corresponding to the positions of each of the sampled particles at each of the discrete sample times. Specifically, for particle P2, vertex points V are generated showing the positions of particle P2 at times T1, T2 and T3, with V1(P2) being the position of particle P2 at time T1, V2(P2) being the position of particle P2 at time T2, and V3(P2) being the position of particle P2 at time T3. Similarly, the bottom portion of FIG. 6 illustrates a similar process for particle P1 wherein vertex points V are generated showing the positions of particle P1 at times T1 and T2, with V1(P1) being the position of particle P1 at time T1, V2(P1) being the position of particle P1 at time T2.

In addition to generating vertex points V for each of the particles, mesher 60 also tags each of the vertex points V with the particle attributes and sample time corresponding to each of the sampled particles at each of the discrete sample times. Finally, mesher 60 also links vertex points V together as polylines, wherein each of the polylines corresponds to the positions of a particular particle at each of the discrete sample times. This is seen in FIG. 6 as a first polyline connecting the three vertex points V1(P2) to V2(P2) to V3(P2); and as a second polyline connecting the two vertex points V1(P1) to V2(P1). An advantage of the present invention is that the polygon mesh is created with the same features as the particle cache.

Figure 7:
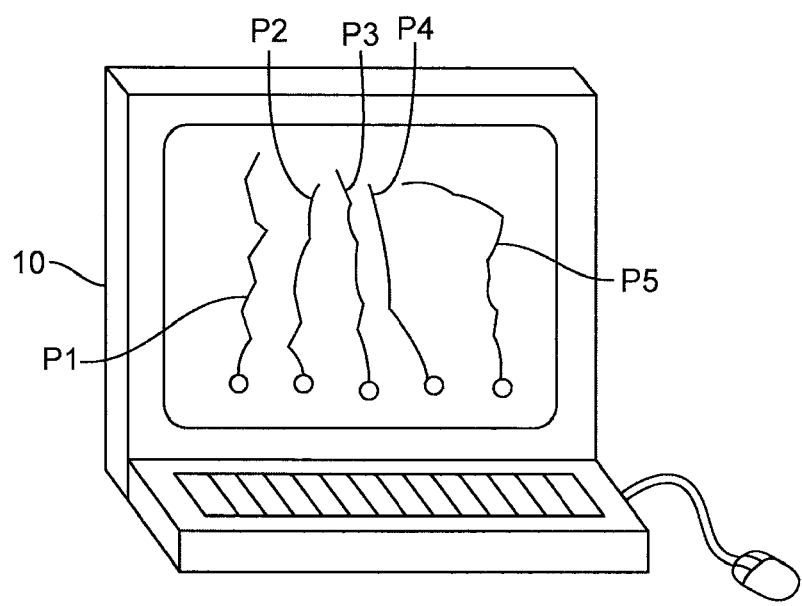
FIG. 7 is an illustration of the resulting particle mesh on the computer screen (showing a rogue particle).
Figure 8:
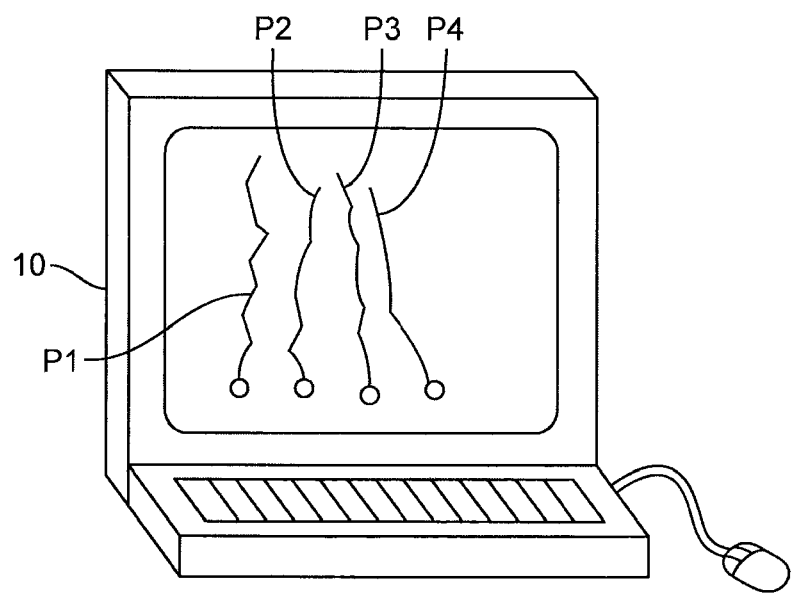
FIG. 8 is an illustration of the resulting particle mesh on the computer screen (after the rogue particle has been removed by mesh editing tools).

Fifth, the polygon mesh can now be edited with a mesh editing tool. This process is illustrated in FIGS. 7 and 8, as follows. FIG. 7 shows the resulting particle mesh with the various vertex points V appearing on the computer screen. A can be seen, particle P5 is a rogue particle (since it has an undesirable trajectory). The artist then uses a standard mesh editing tool to remove particle P5, resulting in the updated display seen in FIG. 8. The present invention is not limited to any particular mesh editing tool, In addition, the mesh editing tool selected may comprise separate physical equipment components, software modules, firmware components, or any combination thereof.

After the particle cache has been converted to a mesh, the artist can select the entire history of rogue particles by clicking on their polyline polygon. Deleting these selected polyline polygons will then remove the rogue particles from the reconstructed particle cache. Similarly, by deleting the vertices that hold samples at unwanted times, the corresponding particle lifetimes can be shortened. Specifically, by truncating the start or end times of the particles, they can easily be made to die earlier or be born later.

Since the position of the particle is exactly represented as the positions of the mesh points, altering point positions alters the particles trajectory. This allows transformations and warps on the model to affect the particle animation. The reconstructed particle cache will retain the change in trajectory.

Some mesh editing tools permit "smoothing" by moving vertices on a polyline so that they lie more in a line, removing bumps and kinks. Doing this to a particle polygon has the advantageous benefit of removing frame-to-frame jittering in the reconstructed trajectory. An example of this is grooming tools that are used on hair polygons.

In addition, particles can also be duplicated simply by copying a particle polyline with all its vertices (thereby creating a new particle in the cache.). This new particle can be transformed or warped to produce variations from the original particle, as desired.

With more advanced editing tools it is possible to manipulate how particles move through time. For example, using a brush that adds to the time value tagged on the polygon vertices, an artist could have the effect of moving the particles later in time, thereby slowing the particles down or making them live longer.

Figure 9:
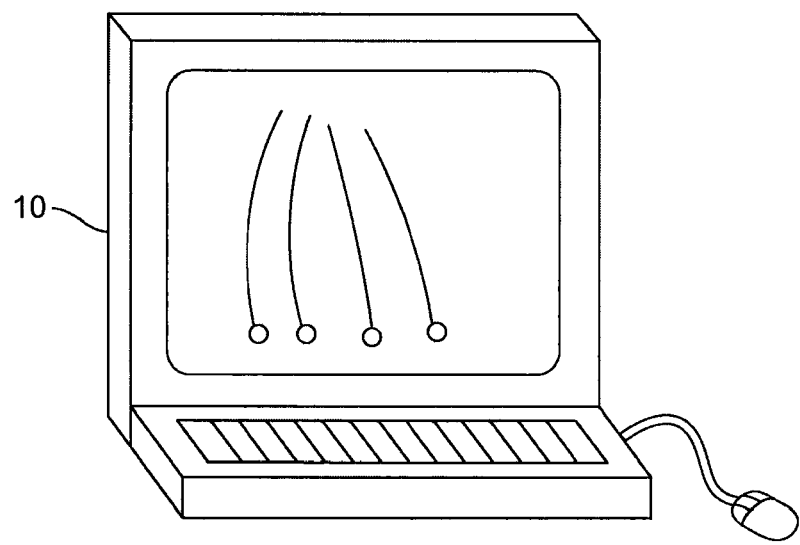
FIG. 9 is an illustration of the resulting particle animation from a second particle cache that has been created after the rogue particles have been removed by the mesh editing tool.

Sixth, now that mesh editing (of a particle cache) has been completed, the present invention can be used to convert the polygon mesh back into a second particle cache (that can be re-run as a new particle animation with the rogue particle removed). This new particle cache can be created by: (i) creating a cache structure having particle position and particle attributes that match the vertex points in the mesh, and (ii) iterating through the discrete sample times to determine the particle position and particle attributes at each of the discrete sample times thereby filling the particle cache. In optional preferred aspects, iterating through the discrete sample times to determine the particle position and particle attributes may comprise interpolating between vertex points in the mesh to determine particle position and particle attributes for target times occurring between the sample times. As a result, the new particle cache is configured to store the position and particle attributes that match the vertex points in the mesh, wherein the second particle mesh is filled by iterating through the discrete sample times to determine the particle position and particle attributes at each of the discrete sample times. FIG. 9 illustrates the particle animation of this second (i.e.: mesh edited) particle cache.

What is claimed is:

1. A method of editing a particle animation using a mesh editing tool, comprising:
 (a) running or inputting a particle animation for a plurality of particles, wherein each of the particles have position and particle attributes that change over time in the animation;
 (b) having a sampler sample the changing position and particle attributes for each of the plurality of particles at discrete times during the particle animation, wherein the sampler generates a unique particle ID for each particle, and associates the position and particle attributes for each particle with each particle ID at each of the discrete sample times;
 (c) caching the sampled position and particle attributes for each of the plurality of particles in a particle cache, wherein the cached position and particle attributes are organized by particle ID and are sorted in time order;
 (d) sending the cached position and particle attributes to a mesher;
 (e) having the mesher generate a polygon mesh comprising vertex points corresponding to the position and time attributes corresponding to each of the sampled particles at each of the discrete sample times;
 (f) having the mesher tag each of the vertex points with the particle position and time attributes corresponding to each of the sampled particles at each of the discrete sample times;
 (g) having the mesher link vertex points together as polylines, wherein each of the polylines corresponds to the positions of a particular particle at each of the discrete sample times; and
 (h) editing the polygon mesh with a mesh editing tool by selecting and deleting mesh vertex points corresponding to one or more rogue particles.

2. The method of claim 1, wherein running the particle animation comprises:
 (i) defining changing particle properties for a plurality of particles; and
 (ii) running a particle simulation.

3. The method of claim 1, wherein the particle attributes include at least one of color, velocity, mass, age, force or rotation.

4. The method of claim 1, wherein the particles are sampled once per frame.

5. The method of claim 1, further comprising converting the polygon mesh into a particle cache after editing the polygon mesh with the mesh editing tool, by:
 (i) creating a cache structure having particle position and particle time attributes that match the vertex points in the mesh, and
 (ii) iterating through the discrete sample times to determine the particle position and particle attributes at each of the discrete sample times thereby filling the particle cache.

6. The method of claim 5, wherein iterating through the discrete sample times to determine the particle position and particle attributes comprises:
 interpolating between vertex points in the mesh to determine particle position and particle attributes for target times occurring between the sample times.

7. The method of claim 1, wherein editing the polygon mesh with a mesh editing tool comprises:
 selecting and deleting mesh vertex points corresponding to unwanted time periods.

8. The method of claim 1, further comprising using a brush to add to the time values tagged on the polygon vertices.

9. A computer animation editing system, comprising:
a processor, wherein the processor implements:
  (a) a sampler, wherein the sampler:
    (i) samples changing position and particle attributes for a plurality of particles at discrete times during a particle animation,
    (ii) generates a unique particle ID for each particle, and
    (iii) associates the position and particle attributes for each particle with each particle ID at each of the discrete sample times;
  (b) a particle cache, wherein the particle cache stores the position and particle attributes sampled by the sampler, wherein the cached position and particle attributes are organized in the particle cache by particle ID and are sorted in time order;
  (c) a mesher, wherein the mesher:
    (i) receives the position and particle attributes stored in the particle cache,
    (ii) generates a polygon mesh comprising vertex points corresponding to the positions and time attributes of each of the sampled particles at each of the discrete sample times,
    (iii) tags each of the vertex points with the particle attributes and the sample time corresponding to each of the sampled particles at each of the discrete sample times, and
    (iv) links vertex points together as polylines, wherein each of the polylines corresponds to the positions of a particular particle at each of the discrete sample times; and
  (d) a mesh editing tool, wherein the mesh editing tool edits the polygon mesh by selecting and deleting mesh vertex points corresponding to one or more rogue particles.

10. The editing system of claim 9, wherein the processor further implements:
  (e) a particle animation system, wherein the particle animation system:
    (i) generates changing particle properties for the plurality of particles, and
    (ii) runs a particle simulation of the changing particle properties for the plurality of particles over a period of time.

11. The editing system of claim 9, wherein the processor further implements:
  (e) a second particle cache, wherein the second particle cache stores the position and particle attributes that match the vertex points in the mesh, and wherein the second particle mesh is filled by iterating through the discrete sample times to determine the particle position and particle attributes at each of the discrete sample times.

* * * * *